July 17, 1962 F. A. YEOMAN 3,045,132
THERMALLY CONDUCTIVE POTTING COMPOSITIONS
Filed July 31, 1958
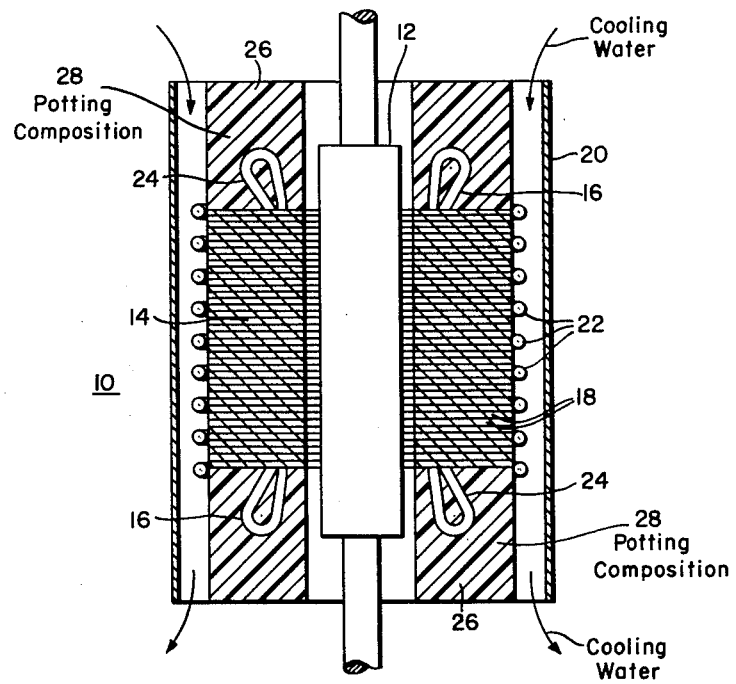
WITNESSES
Edwin E. Bassler
Charles L. Menzemer
INVENTOR
Frederick A. Yeoman
BY
Frederick Stopor
ATTORNEY

United States Patent Office 3,045,132
Patented July 17, 1962

3,045,132
THERMALLY CONDUCTIVE POTTING
COMPOSITIONS
Frederick A. Yeoman, Murrysville, Pa., assignor to Westinghouse Electric Corporation, East Pittsburgh, Pa., a corporation of Pennsylvania
Filed July 31, 1958, Ser. No. 752,217
3 Claims. (Cl. 310—43)

The present inveniton relates to resinous potting compositions and has particular reference to heat hardenable highly thermally conductive solventless silicone resinous potting compositions, and to electrical apparatus with said heat hardened highly thermally conductive resinous composition applied thereto.

In certain types of electrical apparatus, coils are operated inside sealed gas-filled vessels or in other enclosures where they are surrounded by a gaseous medium whose circulation is restricted or prevented. Effective cooling of the coils under such conditions is difficult. If such a coil could be effectively put in contact with a solid of high thermal conductivity over a substantial portion of its surface and this thermally conducting solid extended to a region where good contact with a circulating cooling medium was established, greatly improved cooling of the coil would result.

In some instances coils operating under the difficult conditions just described have been cooled by thermal conduction through metallic copper members in contact with the surface of the coil insulation. This type of cooling is effective, but installation is tedious and expensive particularly when such metallic conductors must be machined to fit coil surfaces closely.

A more expedient means for providing cooling by thermal conduction would result from impregnation of the spaces surrounding the coil with a fluid material which could later be converted to a highly thermally conducting solid.

Such a fluid or potting compound must meet a number of general requirements in addition to many specific requirements which will vary with the particular application. The general requirements are:

(1) The cured potting compound must have a thermal conductivity of at least 0.01 watt/in./in.$^2$/° C.

(2) The potting compound in the uncured condition must have a viscosity in the range of 5,000 to 20,000 centipoises to permit thorough impregnation of the coil or other structure to be cooled.

(3) Low shrinkage, both during initial cure and during subsequent operating life of the apparatus, is important since shrinkage in excess of 5% will result in voids which will seriously impair thermal conduction.

(4) The compound must be thermally stable at the operating temperatures to be encountered. Any gasification which occurs may tend to produce voids, and in sealed vessels may also result in accumulation of sufficient pressure to rupture the vessel. Any crumbling which might result from inadequate thermal stability would produce a discontinuous structure which would not conduct heat effectively.

In the past, various attempts at compounding a thermally conducting potting compound using silicone resins have been tried and been found to be unsatisfactory. It has been a problem to find a catalyst and filler material which are suitable for use with the silicone resins. The two catalysts frequently used to cure solventless silicone resins are di-tert butyl peroxide and dicumyl peroxide. The di-tert butyl peroxide, while effecting satisfactory cure when used as a catalyst in solventless silicone resins, has a boiling point so low that some volatilization occurs at normal curing temperatures. This volatilization leads to the formation of pockets or voids in the cured resin thereby greatly reducing the thermal conductivity of the resin. Dicumyl peroxide, while satisfactory from the standpoint of volatility at curing temperatures has been found to be "killed off" or rendered ineffective by nearly all conventional fillers in the finely divided state and therefore not satisfactory for use in preparing a thermally conductive potting composition.

The discovery has now been made that a highly thermally conductive molding and potting composition may be prepared using certain solventless silicone resins to be described in more detail below, dicumyl peroxide, and a specific alumina filler material, all in specified proportions. Another object of the present invention is to provide electrical members having applied thereto a cured thermally conductive resinous potting composition comprised of a mixture of solventless silicone resins and an inert filler.

Other objects of the invention will, in part, be obvious and will, in part, appear hereinafter.

For a better understanding of the nature and objects of the invention, reference should be had to the following detailed description and drawing, the single FIGURE of which is a cross-sectional front view of an electrical motor with the coil end cavities thereof filled with the thermally conductive solventless silicone resin composition of this invention.

In accordance with the present invention and attainment of the foregoing objects there is provided a resinous potting composition having a viscosity in the range of 5,000 to 20,000 centipoises at 25° C. comprising (A) from 20 to 40% by weight of a mixture comprised of (a) from 40% to 15% by weight based on the weight of resin of a siloxane having the formula (I)
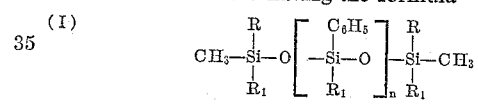

wherein R represents a monovalent organic radical selected from the group consisting of alkyl radicals having not more than 4 carbon atoms and phenyl, tolyl and xylyl radicals, $R_1$ represents a monovalent organic radical selected from the group consisting of methyl and vinyl groups, and $n$ is at least two and has an average value of from 2 to 10, there being at least 2 vinyl groups per molecule, said siloxane having a viscosity not exceeding 1 poise at 25° C., and (b) 60% to 85% by weight, based on the weight of resin of a liquid organo polysiloxane of a viscosity of more than 1 poise, said latter liquid polysiloxane having at least one reactive >C=C< group per molecule and being compatible with (a), and (B) from 0.5% to 2.5% by weight, based on the weight of resin, of dicumyl peroxide and (C) from 80% to 60% by weight of alumina having an average particle size in the range of 3 microns to 85 microns. When applied to conductors and cured, this composition provides a high thermally conductive resin insulation.

The thermally conductive potting composition of this invention is comprised of from 40% to 15% by weight, based on the weight of resin of the siloxane having the structural formula designated I above, and which is described more fully in copending application Serial No. 515,259, now U. S. 2,899,403, which is assigned to the assignee of the present invention. When $n$ has an average value of from 2 to 10, the viscosity is from about 0.10 to 1 poise at 25° C. The most thermally stable and lowest viscosity polysiloxane fluids are obtained when R is methyl in Formulation I.

The polysiloxane compounds wherein $n$ is 1 in the above Formulation I are quite volatile. Compounds wherein $n$ is 2 exhibit a marked decrease in vapor pressure as compared to the compounds wherein $n$ is 1, for instance, they will not boil at 85° C. to 100° C. even at pressures of 0.1 mm. Hg. Consequently, it is preferred to carry out the reactions to produce a minimum of polysiloxane compounds wherein $n$ is 1. If there is present more than a few percent by weight of polysiloxane compounds wherein $n$ equals 1, they can be and should be separated by fractional distillation. Small quantities of trisiloxane compound can be present in the compositions for some uses, particularly if two vinyl groups are present per molecule.

Particularly good polysiloxanes are those having the following formulation:

II)

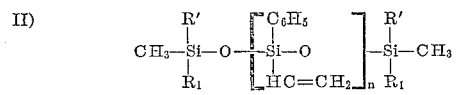

where R′ represents a monovalent radical selected from the group consisting of methyl and phenyl radicals and $R_1$ represents a monovalent radical selected from the group consisting of methyl and vinyl radicals, there being an average of at least two vinyl radicals per molecule, and $n$ is at least two.

Especially low viscosity fluids comprise the following formulation:

(III)

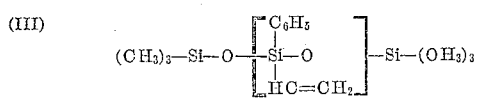

where $n$ is at least 2 and has an average value of from 2 to 10.

Fluids corresponding to Formula I having a viscosity of from approximately 10 to 40 centipoises at 25° C. are obtained when $n$ in the formula has an average value of from 2.0 to 3.5. In Formula III, when $n$ has an average value of 2.5, the viscosity of the fluid is approximately 15 centistokes at 25° C., and when $n$ has an average value of 3, the viscosity is approximately 20 centistokes at 25° C.

The low viscosity polysiloxane liquids of the present invention, for example, those of Formulation III may be prepared by hydrolyzing (a) from 2 to 10 mols, or more, of a phenylvinylsilane monomer in which the remaining two groups attached to silicon comprise a readily hydrolyzable radical such as chlorine, fluorine, alkoxy or aryloxy radicals such, for example, as methoxy, ethoxy or phenoxy, or an amine group with (b) two mols of an end blocking agent such, for example, as a silane monomer having only one readily hydrolyzable group attached to silicon while the other radicals attached to silicon are selected from the group consisting of methyl, phenyl and vinyl radicals, there being not more than one phenyl or more than one vinyl radical on such monomer. The mixture is hydrolyzed with water or an aqueous acid, such as 5% or 20% sulfuric acid. The hydrolyzate is condensed with an acid or an alkali to the polysiloxane. The hydrolysis and condensation of the mixture may be carried out simultaneously. One mol of a disiloxane may be substituted for each two mols of the (b) silane to furnish end blocking groups by cleavage of the disiloxane by an acid condensation catalyst. In such disiloxanes there are six hydrocarbon radicals attached to the two silicon atoms, there being at least one methyl radical on each of the silicon atoms, and not exceeding one phenyl and one vinyl radical on each of the silicon atoms. Examples of such disiloxanes are hexamethyl disiloxane, vinyl pentamethyldisiloxane and divinyltetramethyldisiloxane.

Polysiloxane compositions within the scope of Formula I when employed alone cure into hard and relatively brittle resinous solids. More flexible and tougher solids are obtained if the low viscosity polysiloxane compositions within the scope of Formula I are admixed with compatible more viscous, long chain polysiloxane liquids having reactive $>C=C<$ groups, such as vinyl, allyl and methallyl, attached to silicon by carbon-silicon bonds. The mixed liquid polysiloxane compositions comprise (a) from 40 to 15% by weight based on the weight of resin of the polysiloxane of Formulation I of a viscosity of less than one poise, and preferably below 50 centipoises, at 25° C. and (b) from 60% to 85% by weight, based on the weight of resin of the long chain polysiloxanes having $>C=C<$ groups and of a viscosity of above 1 poise, and preferably above 10 poises at 25° C.

The following examples illustrate the preparation of long chain, high viscosity organopolysiloxanes which may be admixed with the siloxane of Formulation I.

EXAMPLE I

An organopolysiloxane was prepared by hydrolyzing a toluene solution of 4 mols of dichlorophenylvinylsilane and 6 mols of dichloromethylphenylsilane with ice water. The toluene solution with this hydrolyzate was then refluxed for several hours in the presence of KOH or other strong alkali. The alkali was then neutralized by shaking with dilute hydrochloric acid. The viscosity was 13 poises at 25° C.

EXAMPLE II

A polysiloxane liquid was prepared as follows: A mixture of 37.5 parts of diethoxyphenylvinylsilane, 30 parts of diethoxydimethylsilane and 81.2 parts of 1,4-bis-(ethoxydimethylsilyl) benzene was dissolved in about 165 parts of benzene contained in a vessel. The vessel was placed in an ice bath and cooled at 0° C. The solution was hydrolyzed by adding about 100 parts of 80% sulfuric acid while stirring vigorously over a period of about one hour. The solution was removed from the ice bath and stirred for an additional hour, crushed ice being added near the end. The benzene solution containing the condensate was permitted to separate out and the acid-water layer was discarded. Free acid was washed from the benzene solution by treatment with sodium bicarbonate. Water and benzene were then removed by evaporation using heat and vacuum, leaving about 80 parts of a polymerizable intermediate organosiloxane having a viscosity of 6 poises at 25° C.

The only satisfactory catalyst for curing the silicone resins described herein is dicumyl peroxide. The quantity of dicumyl peroxide may vary from 0.5% to 2.5% by weight, based on the total weight of resin.

It is essential that the fillers used be chemically inert with respect to the resins and catalyst used. While many fillers have been tried experimentation has demonstrated that the only filler which is suitable for this invention is levigated alumina particles having an average particle size in the range of 3 to 85 microns.

In preparing the thermally conductive resinous molding composition of this invention, from 40 to 15 parts by weight of the silicone resin having the structural formula designated I above is admixed with from 60 to 85 parts by weight of the compatible more viscous, long chain polysiloxane having reactive $>C=C<$ groups described above and examples of which are set forth in Examples I and II. The admixture is carried out at room temperature.

From 0.5% to 2.5% by weight, based on the total weight of resin, of a catalyst, for example, dicumyl peroxide, which is crystalline solid, is admixed and dissolved in the silicone resin with agitation at room temperature. Levigated alumina having an average particle size in the range of 3 microns to 85 microns is added to the mixture with rapid agitation. The quantity of levigated alumina added may vary from 80% to 20% by weight of the final admixture, the controlling factor being that the final admixture must have a viscosity in the range of 5000 centipoises to 20,000 centipoises, and it is preferable that it have a viscosity in the range of 7500 centipoises to 12,500 centipoises for best results. Either during the admixture of the levigated alumina and silicone resin or after the admixture has been accomplished, the final potting composition should be evacuated thoroughly to insure the removal of any trapped gases.

With reference to the drawing, there is shown an electrical motor 10 comprised of a rotor 12 and stator 14. Stator 14 comprises stator coils 16 which are positioned in slots within core laminations 18. The stator 14 is surrounded by a water jacket 20 through which cooling water is passed to contact cooling coils 22. As illustrated on the drawing, coil ends 24 of the stator coil 16 are positioned in a metallic casing forming the jacket 20 which forms an end-turn cavity 26. It is the cooling of these coil ends in the end cavities to which the thermally conductive potting composition of this invention has particular application. The coil end cavities 26 are filled with the potting composition 28 of this invention.

The potting composition is then cured in place or separately as will be described subsequently. As the electrical apparatus 10 is operated, cooling water passing through the cooling jacket 20 serves to cool the coils and other portions of the stator in which they are positioned. However, as heat builds up in the coil ends 24, this heat is transmitted to the metal surface of the metallic casing by the potting composition 28 of this invention.

If desired, the thermally conductive potting compound 28 of this invention may be disposed and cured about the coil ends 24 before the water jacket 20 is disposed about the apparatus 10. The potting compound is then machined to the proper dimensions so that the jacket 20 will pass over it with a minimum of clearance. This insures intimate contact between the potting composition and the walls of the cooling jacket.

The following examples taken in conjunction with the previous two examples are illustrative of the practice of this invention.

Example III below illustrates the preparation of the polysiloxane having the structural formula denoted I above.

Example IV illustrates the combination of the resin of Examples I and III and the incorporation of filler material therein to provide the potting composition of the present invention.

Example V is concerned with illustrating the application of the potting material of this invention to an electric motor.

EXAMPLE III

A polysiloxane resin was prepared by admixing and reacting 2 moles of phenylvinyldichlorosilane with 2 moles of phenyl dimethyl chlorosilane in at least an equal volume of benzene. The vessel was placed in an ice bath and cooled to 0° C. The solution was hydrolyzed by adding about 100 parts of 80% sulfuric acid while stirring vigorously over a period of 1 to 3 hours. The solution was then removed from the ice bath and stirred for approximately another hour with crushed ice being added near the end. The benzene solution containing the condensate was permitted to separate out and the acid water layer was discarded. Free acid was washed from the benzene solution by treatment with sodium bicarbonate. Water and benzene were removed by evaporation using heat and vacuum. The remaining fluid was an organosiloxane having an average structural formula of the class denoted I above in which $n=2$. Its viscosity was between 10 and 15 centipoises at 25° C.

A polysiloxane resin of the same type as described in Example I above in which $n=3$ may be prepared by substituting 3 mols of phenylvinyldichlorosilane for the 2 moles used in Example I. Its viscosity was about 25 centipoises at 25° C.

Equally satisfactory low viscosity reactive siloxanes can be realized by substituting equal molar amounts of phenylmethylvinylchlorosilane for phenyldimethylchlorosilane in Example III. This last siloxane had a viscosity of 15 centipoises at 25° C.

EXAMPLE IV

Part A.—35 parts by weight of the low viscosity silicone resin of Example III were admixed with 65 parts by weight of the siloxane resin of Example I. One part by weight dicumyl peroxide was then dissolved and admixed in the resinous mixture.

Part B.—30 parts by weight of the catalyzed silicone resinous composition of Part A above was admixed and combined with 70 parts by weight of levigated alumina having an average particle size of 60 microns. The viscosity of this composition was approximately 10,000 centipoises at 25° C.

Part C.—The filled resin composition of Part B above was then poured into a mold and baked at 140° C. until gelation occurred—a period of three hours and fifteen minutes. The gelled resin casting was then baked for 16 hours at 150° C. and for 5 additional hours at 200° C. The thermal conductivity of the sample was found to be 0.0186 watt/in./in.$^2$/°C. The shrinkage of the resin, on curing, was of the order of 3%. A cross section of this casting was examined and found to be dense and void free. Dielectric breakdown strength of a 125-mil thick panel of this material averaged 381 volts/mil. Breakdown was measured by 2 kv./sec. straight rise between one inch diameter, round edge electrodes.

EXAMPLE V

The following three 440 volt, 60 cycle, 3 phase, 2 pole 3600 r.p.m. electric motors were constructed to demonstrate the advantages of this invention.

Motor I

The coil ends of this motor were not potted in the composition of this invention. The coil end cavities contained only air as a heat conducting medium.

Motor II

The coil ends were potted with the composition of this invention as set forth in Example VII. The potting composition was cured in place as described above.

Motor III

The coil ends were potted with the composition of this invention as set forth in Example VII. The potting composition was cured and then machined to proper size to fit within the cooling jacket. This ensured an intimate contact between the cooling jacket and the potting composition as described above.

The three motors were operated under varying loads with the results indicated in tabular form below. The load is expressed in brake horsepower as illustrated in the table, the temperature of the coil windings in all three motors increased as the brake horsepower was increased.

| Brake Horsepower | 10 | 12 | 14 | 16 | 18 |
|---|---|---|---|---|---|
| Motor I _____ °C__ | 85 | 105 | 135 | 165 | 205 |
| Motor II _____ °C__ | 50 | 62 | 81 | 110 | 144 |
| Motor III _____ °C__ | 44 | 56 | 70 | 90 | 130 |

Since the motors were identical except for the potting of the end coils, the lower rise in the temperature of the windings of motors II and III compared with motor I is directly attributable to the use of the potting composition of this invention. It will be noted that motor III, in which there was a more intimate contact between the potting composition and the cooling jacket, experienced less of a temperature rise than motor II, in which the potting composition was cured in place. Both motors II and III were far superior to motor I which did not contain the thermally conductive potting composition of this invention.

Since certain changes in carrying out the above process and in the product embodying the invention may be made without departing from its scope, it is intended that the accompanying description and drawing be interpreted as illustrative and not limiting.

I claim as my invention:

1. In an electrical machine including a rotor, a stator comprising a plurality of coils having end turns which tend to develop heat when the machine is operated, and a coil-enclosing metallic jacket adapted for the passage therethrough of a coolant, the improvement which comprises embedding at least said coil end turns, within said metallic jacket, in solid insulation comprising a heat-hardened resinous composition adapted to conduct therethrough heat developed by said coil end turns, during operation of said machine, to said metallic jacket, said resinous composition being an admixture comprising (A) from 20% to 40% by weight of a mixture comprised of (a) from 40% to 15% by weight, based on the weight of the resin, of a siloxane having the formula

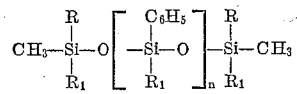

wherein R represents a monovalent organic radical selected from the group consisting of alkyl radicals having not more than 4 carbon atoms and phenyl, tolyl, and xylyl radicals, $R_1$ represents a monovalent organic radical selected from the group consisting of methyl and vinyl groups, and $n$ is at least two and has an average value of from 2 to 10, there being at least 2 methyl groups per molecule, said siloxane having a viscosity not exceeding 1 poise at 25° C, and (b) from 60% to 85% by weight, based on the weight of resin, of a hydrocarbon substituted siloxane having a viscosity of substantially more than 1 poise and having about two hydrocarbon groups per silicon atom attached to silicon by C to Si bonds, the said (b) siloxane having at least one ethylenic group per molecule attached directly to silicon by a C to Si bond, said ethylenic group being selected from the group consisting of vinyl, allyl, and methallyl radicals and at least 50% of the radicals directly attached to silicon, other than oxygen and residual hydroxyl groups directly attached to silicon, consisting of at least one radical selected from the group consisting of methyl and phenyl radicals, and (B) from 80% to 60% by weight of alumina having an average particle size in the range of from 3 to 85 microns, said admixture of organo polysiloxanes (a) and (b) and said alumina (B) having been polymerized by heating the same in the presence of from 0.5% to 2.5% by weight, based on the weight of the resinous composition, of dicumyl peroxide.

2. In an electrical machine including a rotor, a stator comprising a plurality of coils having end turns which tend to develop heat when the machine is operated, and a coil-enclosing metallic jacket adapted for the passage therethrough of a coolant, the improvement which comprises embedding at least said coil end turns, within said metallic jacket, in solid insulation comprising a heat-hardened resinous composition adapted to conduct therethrough heat developed by said coil end turns, during operation of said machine, to said metallic jacket, said resinous composition being an admixture comprising (A) from 20% to 40% by weight of a mixture comprised of (a) from 40% to 15% by weight, based on the weight of the resin, of a siloxane having the formula

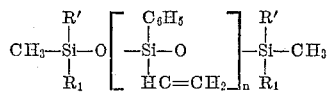

where R' represents a monovalent radical selected from the group consisting of methyl and phenyl radicals and $R_1$ represents a monovalent radical selected from the group consisting of methyl and vinyl radicals, there being an average of at least two vinyl radicals per molecule, and $n$ is at least two, and (b) from 60% to 85% by weight, based on the weight of resin, of a hydrocarbon substituted siloxane having a viscosity of substantially more than 1 poise and having about two hydrocarbon groups per silicon atom attached to silicon by C to Si bonds, the said (b) siloxane having at least one ethylenic group per molecule attached directly to silicon by a C to Si bond, said ethylenic group being selected from the group consisting of vinyl, allyl, and methallyl radicals and at least 50% of the radicals directly attached to silicon, other than oxygen and residual hydroxyl groups directly attached to silicon, consisting of at least one radical selected from the group consisting of methyl and phenyl radicals, and (B) from 80% to 60% by weight of alumina having an average particle size in the range of from 3 to 85 microns, said admixture of organo polysiloxanes (a) and (b) and said alumina (B) having been polymerized by heating the same in the presence of from 0.5% to 2.5% by weight, based on the weight of the resinous composition, of dicumyl peroxide.

3. In an electrical machine including a rotor, a stator comprising a plurality of coils having end turns which tend to develop heat when the machine is operated, and a coil-enclosing metallic jacket adapted for the passage therethrough of a coolant, the improvement which comprises embedding at least said coil end turns, within said metallic jacket, in solid insulation comprising a heat-hardened resinous composition adapted to conduct therethrough heat developed by said coil end turns, during operation of said machine, to said metallic jacket, said resinous composition being an admixture comprising (A) from 20% to 40% by weight of a mixture comprised of (a) from 40% to 15% by weight, based on the weight of the resin, of a siloxane having the formula

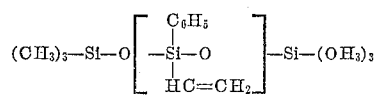

where $n$ is at least two and has an average value of from 2 to 10, and (b) from 60% to 85% by weight, based on the weight of resin, of a hydrocarbon substituted siloxane having a viscosity of substantially more than 1 poise and having about two hydrocarbon groups per silicon atom attached to silicon by C to Si bonds, the said (b) siloxane having at least one ethylenic group per molecule attached directly to silicon by a C to Si bond, said ethylenic group being selected from the group consisting of vinyl, allyl, and methallyl radicals and at least 50% of the radicals directly attached to silicon, other than oxygen and residual hydroxyl groups directly attached to silicon, consisting of at least one radical selected from the group consisting of methyl and phenyl radicals, and (B) from 80% to 60% by weight of alumina having an average particle size in the range of from 3 to 85 microns, said admixture of organo polysiloxanes (a) and (b) and said alumina (B) having been polymerized by heating the same in the presence of from 0.5% to 2.5% by weight, based on the weight of the resinous composition, of dicumyl peroxide.

References Cited in the file of this patent

UNITED STATES PATENTS

| | | |
|---|---|---|
| 2,671,069 | Savage | Mar. 2, 1954 |
| 2,714,099 | Weyenberg | July 26, 1955 |
| 2,816,089 | Willis | Dec. 10, 1957 |
| 2,899,403 | Lewis | Aug. 11, 1959 |
| 2,941,905 | Hofmann | June 21, 1960 |